J. P. SMITH.
Corn Sheller.
No. 22,898. Patented Feb. 8, 1859.
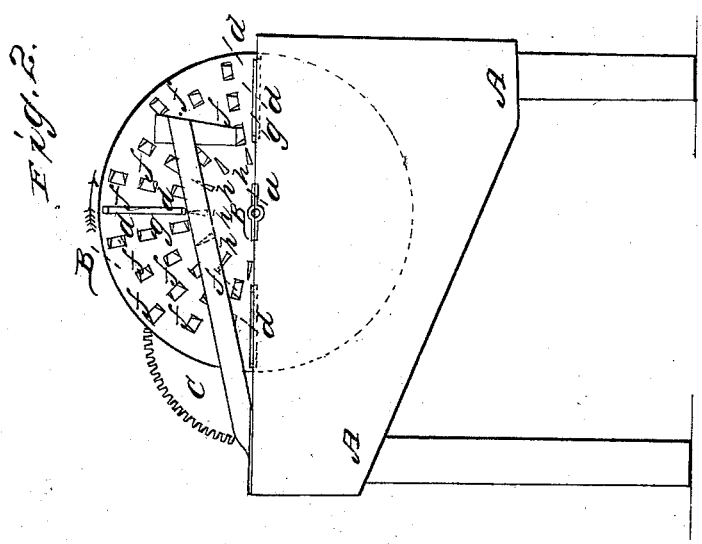
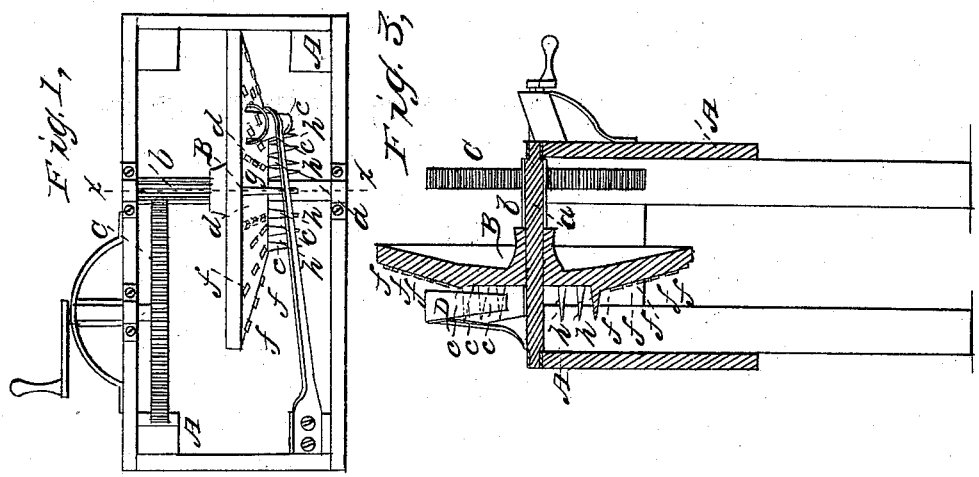
Witnesses,
Wm J. Nisby
Benj. J. Hammel
Inventor:
Jeremiah P. Smith

UNITED STATES PATENT OFFICE.

JEREMIAH P. SMITH, OF HUMMELSTOWN, PENNSYLVANIA.

CORN-SHELLER.

Specification of Letters Patent No. 22,898, dated February 8, 1859.

*To all whom it may concern:*

Be it known that I, JEREMIAH P. SMITH, of Hummelstown, in the county of Dauphin and State of Pennsylvania, have invented a new and Improved Corn-Sheller; and I do hereby declare that the following is a full and exact description thereof, reference being had to the accompanying drawings, making part of this specification, Figure 1 being a plan of the machine; Fig. 2, a side elevation thereof; Fig. 3, a transverse vertical section thereof in the plane indicated by the line $x$, $x$, Fig. 1.

Like letters designate corresponding parts in all the figures.

A suitable frame A, is provided, in which is mounted a shelling-wheel or disk B, situated on a horizontal shaft $a$, and turned by a cog-wheel C, gearing into a pinion $b$, on said shaft, or in any convenient manner. The shelling-wheel or disk may be cast in a single piece, or otherwise formed. The face of the disk may be somewhat convex or conical, as represented in the drawings, on which surface teeth $f$, $f$, are arranged, generally in radial rows, forming groups which alternate with smooth spaces $d$, $d$, as shown in Figs. 1 and 2. These teeth are made abrupt in the direction of their motion, so as to act effectually on the ears of corn. Across each of the spaces $d$, $d$, extends a rib $g$, raised sufficiently above the surface of the disk, to prevent the ears of corn from sinking too deeply into the spaces to be properly seized and acted upon again by the teeth $f$, $f$. These spaces $d$, $d$, by presenting a smooth surface to the ears of corn, when they come in contact, leave the ears free to remain at rest when it is not necessary for them to turn, thereby avoiding an undue expenditure of power, or to be drawn downward by the long shelling-teeth $h$, $h$, $h$. These shelling teeth are arranged in a circle, in positions parallel with the axis of the disk, and their forward edges (as the disk revolves) are made sharp. I usually make the sharp edges of the teeth concave, as shown at $c$, $c$, in the drawings, so as to fit the shape of the ear; but they may be made straight.

The ears of corn are fed, one by one, to the shelling-disk, through a tubular or funnel-shaped rest, or ear-holder, D, secured in any convenient manner so as to hold all ears of corn sufficiently close and firm to the shelling-disk, but to possess sufficient elasticity to yield to any size of ear. When the ears are fed in through the rest or ear-holder D, on turning the disk B, in the direction indicated by the arrow, the grains are started from the cobs by the teeth $f$, $f$, on the convex or conical surface of the disk, and different sides of the ears are continually presented to the shelling teeth $h$, $h$, $h$, which act on the grains lengthwise of the ears, and rapidly separate them from the cob.

What I claim as my invention, and desire to secure by Letters Patent, is—

The arrangement of the groups of short teeth $f$, $f$, alternating with the smooth spaces $d$, $d$, which are provided with the raised ribs $g$, $g$, in combination with the sharp-edged teeth $h$, $h$, $h$, (with curved or straight edges,) when arranged circularly in lines parallel with the axis of the wheel and operating in connection with the ear-holder D, so as to act on the ears of corn nearly lengthwise thereof, substantially in the manner and for the purposes herein specified.

In witness that the above is a true specification of my improved corn sheller, I hereunto set my hand this 18th day of November, 1858.

JEREMIAH P. SMITH.

Witnesses:
   GEO. C. STREIN,
   JESSE B. HUMMEL.